US012667968B2

(12) United States Patent
Winkelvos et al.

(10) Patent No.: US 12,667,968 B2
(45) Date of Patent: Jun. 30, 2026

(54) METHOD, COMPUTER PROGRAM, DEVICE AND COMMUNICATION INTERFACE FOR A COMMUNICATION BETWEEN A ROBOT AND TRANSPORTATION EQUIPMENT, AND TRANSPORT MEANS AND ROBOT

(71) Applicant: VOLKSWAGEN AKTIENGESELLSCHAFT, Wolfsburg (DE)

(72) Inventors: Timo Winkelvos, Sickte (DE); Daniel Schütz, Lehre (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 69 days.

(21) Appl. No.: 18/841,945

(22) PCT Filed: Feb. 16, 2023

(86) PCT No.: PCT/EP2023/053924
§ 371 (c)(1),
(2) Date: Aug. 27, 2024

(87) PCT Pub. No.: WO2023/161127
PCT Pub. Date: Aug. 31, 2023

(65) Prior Publication Data
US 2025/0178201 A1       Jun. 5, 2025

(30) Foreign Application Priority Data
Feb. 28, 2022     (DE) ..................... 10 2022 202 040.5

(51) Int. Cl.
*B25J 9/16*            (2006.01)
*H04L 9/40*            (2022.01)
(52) U.S. Cl.
CPC ........ *B25J 9/1679* (2013.01); *H04L 63/0442* (2013.01)

(58) Field of Classification Search
CPC .... B25J 9/1679; H04L 63/0442; B60L 53/30; G05B 2219/40039; B60S 3/008;
(Continued)

(56) References Cited

U.S. PATENT DOCUMENTS 9,701,012 B1    7/2017  Theobald
10,504,094 B1   12/2019  Gaudin et al.
(Continued)

FOREIGN PATENT DOCUMENTS

CN      109177940 A    1/2019
CN      110803065 A    2/2020
(Continued)

OTHER PUBLICATIONS

Search Report; International Patent Application No. PCT/EP2023/053924; Apr. 13, 2023.

*Primary Examiner* — B M M Hannan
(74) *Attorney, Agent, or Firm* — BARNES & THORNBURG LLP

(57)            ABSTRACT

A method, computer program, device and communication interface provide communication between a robot and transport equipment, wherein application protocols for applications compatible with the transport equipment are received by the transport equipment or the robot. If necessary, the robot is initialized by a manufacturer of the transport equipment or a service provider. Thereafter, an authentic connection is established between the robot and the transport equipment and conditions and statuses for an action to be carried out by the robot are negotiated, followed by assignment of the action to be carried out by the robot. During the processing of the action to be carried out, the robot triggers at least one action for execution by a component of the transport equipment based on an application protocol. If necessary, the statuses or sensor data can be exchanged
(Continued)

between the transport equipment and the robot while the at least one action is performed.

15 Claims, 5 Drawing Sheets

(58) Field of Classification Search
CPC ...... B60S 5/02; B60S 5/04; B60S 3/04; B60S 13/00; B60S 1/0411; B60S 1/52; B60S 1/56; B60S 1/566; B60S 1/64; B60S 3/063; B60S 3/066; B60S 5/00; B60S 5/06
USPC ........................................................ 700/245
See application file for complete search history.

(56) References Cited

U.S. PATENT DOCUMENTS

| | | | |
|---|---|---|---|
| 10,562,432 | B2 | 2/2020 | Chelian |
| 11,020,856 | B2 | 6/2021 | Herold et al. |
| 2016/0352113 | A1* | 12/2016 | Zhao ...................... B60L 53/14 |
| 2018/0001777 | A1 | 1/2018 | Kilic |
| 2018/0215043 | A1 | 8/2018 | Michalakis |
| 2018/0311822 | A1* | 11/2018 | Kaminka ............... B25J 9/1682 |
| 2019/0030720 | A1* | 1/2019 | Herold ................... B25J 9/1661 |
| 2019/0358818 | A1 | 11/2019 | Kanitz |
| 2019/0364022 | A1 | 11/2019 | Narendra et al. |
| 2020/0376667 | A1* | 12/2020 | Götvall .................. B25J 9/1602 |
| 2021/0132625 | A1* | 5/2021 | Gillett .................. G05D 1/0088 |
| 2021/0197684 | A1 | 7/2021 | Graham et al. |
| 2021/0331706 | A1* | 10/2021 | Kim ....................... B60K 35/80 |
| 2022/0089237 | A1* | 3/2022 | Sverdlov ............... B25J 9/1697 |
| 2023/0027010 | A1* | 1/2023 | Raynal .................. H04L 9/3226 |
| 2023/0123504 | A1* | 4/2023 | Paolozzi ................... B25J 5/02 |
| | | | 15/3 |
| 2024/0051134 | A1* | 2/2024 | Hasunuma ............. B25J 9/1664 |

FOREIGN PATENT DOCUMENTS

| | | | |
|---|---|---|---|
| DE | 102014226357 | A1 | 6/2016 |
| DE | 102016004889 | A1 | 10/2017 |
| DE | 102016221488 | A1 | 5/2018 |
| DE | 102019008060 | A1 | 7/2020 |
| EP | 3747688 | A1 | 12/2020 |
| WO | 2020126830 | A1 | 6/2020 |

* cited by examiner

1

METHOD, COMPUTER PROGRAM, DEVICE AND COMMUNICATION INTERFACE FOR A COMMUNICATION BETWEEN A ROBOT AND TRANSPORTATION EQUIPMENT, AND TRANSPORT MEANS AND ROBOT

PRIORITY CLAIM

This patent application is a U.S. National Phase of International Patent Application No. PCT/EP2023/053924, filed 16 Feb. 2023, which claims priority to German Patent Application No. 10 2022 202 040.5, filed 28 Feb. 2022, the disclosures of which are incorporated herein by reference in their entireties.

SUMMARY

Illustrative embodiments relate to a method, a computer program with instructions, a device and a communication interface for communication between a robot and transport equipment. The disclosed embodiments further relates to transportation equipment and a robot in which a solution disclosed embodiments is used.

BRIEF DESCRIPTION OF THE DRAWINGS

Disclosed embodiments will be described in more detail below with reference to drawings, in which.

DETAILED DESCRIPTION

Figure 1:
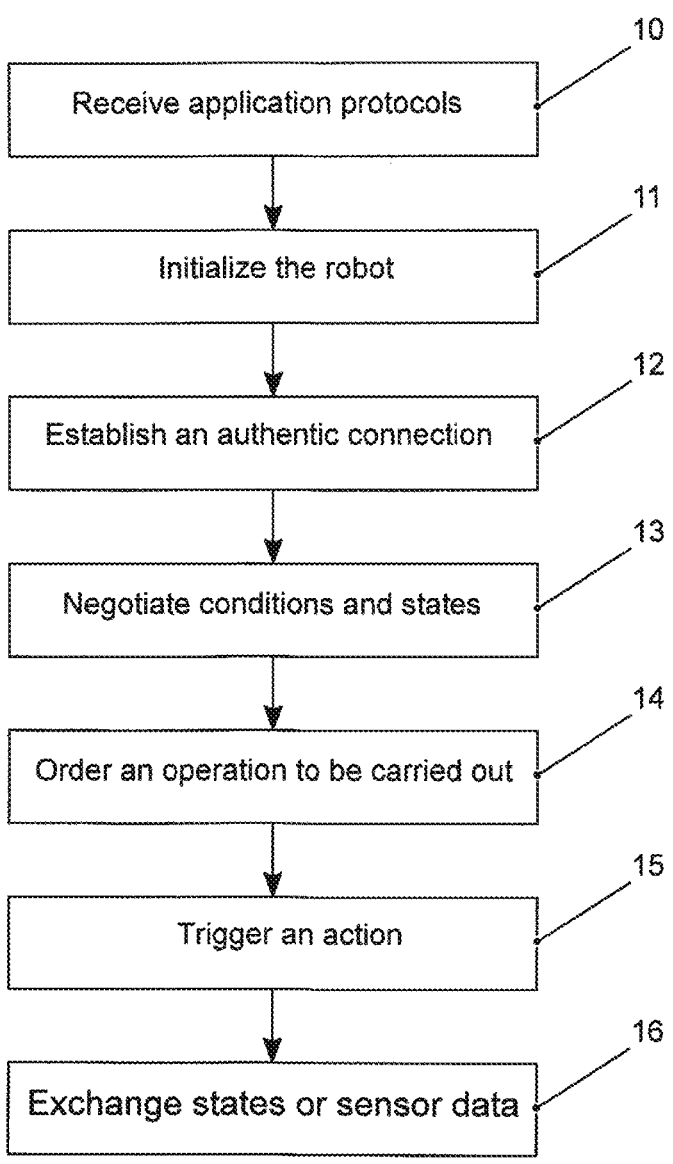
FIG. 1 schematically shows a method for communication between a robot and transportation equipment.

The automatic parking and driving functions, which will be available in the next generations of transportation vehicles and will fundamentally change the way transportation vehicles are handled, result in a need for automatic services in the transportation vehicle. In addition to automatic charging or refueling, further applications are also coming to the fore, for example, the use of robots for automatic interior cleaning, sensor cleaning, loading and unloading, parking or for carrying out inspection, maintenance, wheel changes or reconfiguration of the interior.

For example, U.S. Pat. No. 11,020,856 B2 describes a transportation vehicle with a data interface for transmitting data to a robot. The transportation vehicle has a control device, which is configured to generate control signals for controlling the robot for a predefined work task and to transmit them to the robot via the data interface.

US 2019/0358818 A1 describes a cleaning system for a transportation vehicle. The transportation vehicle includes a passenger compartment and a transportation vehicle cleaning system. The transportation vehicle cleaning system includes a vacuum unit and a robot. The robot includes an arm with a multiplicity of arm sections and a gripper unit arranged at a distal end of the arm. The robot is connected to the vacuum unit in such a way that the arm forms a vacuum path between the vacuum unit and the gripper unit.

US 2021/0197684 A1 describes a robot system for refueling or charging a transportation vehicle. The robot system includes a robot arm and flexible line that is operatively connected to the robot arm to deliver fuel or power to a transportation vehicle. The robot system also includes a control system for operating the robot arm and the line, wherein the control system contains a sensor for identifying the transportation vehicle and determining whether the transportation vehicle is authorized to use the robot system.

Up to now, Car2X communication and communication via a diagnostic interface have essentially been available for communication with transportation equipment. In Car2X communication, however, there is no provision, for example, for a robot to be granted access to the interior of the transportation equipment via automatically opening doors or windows. However, this is absolutely necessary depending on the desired service. Furthermore, it is not possible to claim access to electronic systems of the transportation equipment with this interface. The diagnostic interface cannot be reached wirelessly without additional means and does not allow dedicated, application-related communication with a robot without expansion.

DE 10 2019 008 060 A1 describes a method for carrying out an electrical charging process of an electrical energy storage device of an electrically operated transportation vehicle, wherein a charging request is transmitted to a control unit of the electrically operated transportation vehicle using a communication terminal or using an infotainment system of the electrically operated transportation vehicle. A control signal is generated by the control unit on the basis of the transmitted charging request, and the generated control signal is transmitted to a vehicle-side charging connection of the electrically operated transportation vehicle and to a main unit of the infotainment system via a communication bus using the control unit. The control signal is transmitted to a charging device via a local radio network of the main unit of the infotainment system, wherein, on the basis of the control signal transmitted to the vehicle-side charging connection and to the charging device, an automatic plug contact of a charging plug of the charging device with the vehicle-side charging connection is carried out.

DE 10 2016 221 488 A1 describes a method for autonomously operating a transportation vehicle which is at least partially electrically operable. The method is provided after a charging process of an electrical energy storage device of the transportation vehicle and can then be carried out by a control device of the transportation vehicle. The control device first detects an end to the charging process of the transportation vehicle. In a next operation, the control device detects a decoupling of the transportation vehicle from the charging infrastructure, for example, a signal from charging infrastructure to enable the departure. Once the decoupling of the transportation vehicle has been detected, the transportation vehicle will depart autonomously. The control device autonomously parks the transportation vehicle within a transfer area for the transportation vehicle.

DE 10 2016 004 889 A1 describes a method for supplying electrical energy or fuel to a transportation vehicle by a robot at a filling station. In the method, a type or a plurality of temporally successive positions of the transportation vehicle relative to the robot are determined by a depth sensor. An interface carried by the robot is connected to the transportation vehicle and electrical energy or fuel is supplied to the transportation vehicle via this interface. Depending on the positions determined, navigation data can be transmitted to the transportation vehicle.

DE 10 2014 226 357 A1 describes a method for automatically charging an electrical energy storage device in a vehicle. For this purpose, the position of a charging socket on a vehicle is first determined based on vehicle-specific data. A charging robot on the ground then moves into the vicinity of the charging socket. The charging robot then establishes an electrical connection between the charging station and the charging socket. To do this, the charging robot inserts a contact head connected to the charging station into the charging socket of the transportation vehicle. After the charging process is complete, the contact head is pulled out of the charging socket and the transportation vehicle is thus released.

U.S. Pat. No. 10,504,094 B1 describes solutions for using a transportation vehicle as a mechanism for payment, so that a user can remain in the transportation vehicle when paying for goods and services. An application that stores data representing financial cards for payments is stored in an infotainment system of the transportation vehicle. In order to retrieve one of the stored financial cards for a payment, the user can select information for a financial card on the infotainment system. In response to the selection, the infotainment system transmits the selected data to a POS terminal via a short-range communication connection. The POS terminal can then process the payment based on the transmitted data and can transmit an electronic receipt that is displayed on the infotainment system.

With regard to the automatic charging of electric vehicles, the idea of a suitable communication interface has already emerged. However, the communication interface provided is only intended for this application.

The disclosed embodiments provide improved solutions for communication between a robot and transportation equipment.

According to a feature of the disclosed embodiments, a method for communication between a robot and a transport mechanism establishes an authenticated connection between the robot and the transportation equipment, negotiates conditions and states, for an operation to be carried out by the robot, orders the operation to be carried out by the robot, and triggers the robot, at least one action to be performed by a component of the transport mechanism, wherein the at least one action is based on an application protocol.

According to another feature of the disclosed embodiment, a computer program comprises instructions which, when executed by a computer, cause the computer to perform communication between a robot and a transport mechanism that includes establishing an authenticated connection between the robot and the transport mechanism, negotiating conditions and states, for an operation to be carried out by the robot, ordering the operation to be carried out by the robot; and triggering the robot, at least one action to be performed by a component of the transport mechanism, wherein the at least one action is based on an application protocol.

The term computer can be broadly understood. In particular, it also includes control units, embedded systems and other processor-based data processing devices.

The computer program can be provided, for example, for electronic retrieval or stored on a computer-readable storage medium.

According to another feature of the disclosed embodiment, a device for communication between a robot and transportation equipment comprises: a connection module that establishes an authenticated connection between the robot and the transportation equipment; a communication module for negotiating conditions and states, for an operation to be carried out by the robot and for ordering the operation to be carried out by the robot; and a control module for triggering the robot, at least one action to be performed by a component of the transportation equipment, wherein the at least one action is based on an application protocol.

According to another feature of the disclosed embodiment, a communication interface for communication between a robot and transportation equipment is configured to: receive application protocols for applications compatible with the transportation equipment; establish an authenticated connection between the robot and the transportation equipment; negotiate conditions and states, for an operation to be carried out by the robot and to order the operation to be carried out by the robot; and trigger the robot, at least one action to be performed by a component of the transportation equipment, wherein the at least one action is based on an application protocol.

In the presently disclosed solution, a universal communication interface is provided and can be used to ensure communication for each automated service via different robots. The communication interface can be used for both known and as yet unknown applications which also require, in addition to information about the transportation equipment or the states of the transportation equipment, interactions between the transportation equipment and a robot or other infrastructure, possibly also interactions with persons, if individual required actions or states cannot be carried out or established automatically. The solution has the advantage that a new communication standard, which must be adjusted over several years and individually integrated into the transportation equipment, is not required for every application of an automated service.

According to a feature of the disclosed embodiments, application protocols for applications compatible with the transportation equipment are received by the transportation equipment or the robot from a backend of a manufacturer of the transportation equipment or a service provider. Once the process for a new application has been described and approved, the process is transmitted to the transportation equipment or robot as an application protocol. This can be done, for example, by a mobile radio connection via a backend. The application defined in the application protocol can then be performed automatically together with the external robots or other infrastructure means, supported if necessary by persons who perform individual actions manually.

According to a feature of the disclosed embodiments, the application protocols include process operation with state conditions, state-changing actions or interactions. For example, the actions may include actuation of actuating drives, switching lights, indicating elements or other systems on or off, setting the idle speed, or moving into a target pose. This makes it possible to ensure that the transportation equipment is always in a state required for the respective process operation during execution of a process.

According to one feature of the disclosed embodiment, trust levels are specified for actions. In order to meet the universal application requirement mentioned further above, it makes sense to take account of the diverse and high demands on the relationships of trust between robots and transportation equipment. The use of trust levels means that actions deemed critical can only be performed if a sufficiently good relationship of trust has been established.

According to one feature of the disclosed embodiment, the actions can be aborted by the robot. This is particularly beneficial if people in the surroundings of the transportation equipment could be endangered or there is a threat of damage to the transportation equipment or the robot.

According to one feature of the disclosed embodiment, states or sensor data are exchanged between the transportation equipment and the robot. For example, the robot can provide the transportation equipment with environmental information that the transportation equipment cannot capture itself, e.g., due to a lack of a sensor system. This allows safety conditions to be complied with even in the absence of a driver. The sensors of the transportation equipment, e.g., sensors for interior monitoring, can in turn be used to safeguard the robot process.

According to one feature of the disclosed embodiment, the authenticated connection is a two-channel connection. A two-channel connection is particularly beneficial for a mutually authenticated connection between the robot and the transportation equipment.

According to one feature of the disclosed embodiment, the authenticated connection is established on the basis of a public key infrastructure. Using a public key infrastructure makes it possible to easily ensure that the communication between the robot and the transportation equipment is mutually authenticated by certificates.

According to one feature of the disclosed embodiment, the robot is initialized by a manufacturer of the transportation equipment or a service provider, during which a symmetrical key for an action to be performed by a component of the transportation equipment is transmitted to the robot. In the backend of the manufacturer or a service provider commissioned by the manufacturer, there are the various symmetrical keys that are used in the respective transportation equipment. During initialization, the keys required for the specific process are transmitted to the robot. The robot first establishes a relationship of trust with the backend, e.g., using a secret that was loaded during robot production.

According to one feature of the disclosed embodiment, the symmetrical key is used to trigger an action defined as critical in an authenticated manner. The components in the actuator system of transportation equipment are often embedded systems which are subject to some restrictions regarding the use of cryptography. The computationally intensive and memory-intensive asymmetric algorithms, which normally prove relationships of trust to be authenticated with the help of a public key infrastructure, therefore, often cannot be used here. This means that these critical components of higher trust levels (e.g., trust level 2) are regularly protected with symmetrical keys. The symmetrical keys transmitted during initialization, therefore, make it possible to realize an authenticated, approved connection between the robot and special, technically restricted but contentwise highly critical systems of the transportation equipment. An example of a contentwise highly critical system is the brake control unit of a transportation vehicle.

According to one feature of the disclosed embodiment, a relationship of trust is established between the transportation equipment and a set of robots. Depending on the application, it may be necessary for a plurality of robots to work together on the transportation equipment. These can be individual robots, e.g., a charging robot and a transport robot, or robot modules that connect to form a robot. By extending the relationship of trust to a set of robots, it is not necessary to individually establish a relationship of trust for each robot or each robot module. Examples of robots or robot modules that can work together include a special gripper arm for refueling, a transport robot, a lifting platform robot, a cleaning robot, a thin gripper arm for interventions in the engine compartment or an interface gripper arm for accessing a diagnostic interface.

Disclosed embodiments are particularly useful in transportation equipment or in a robot. The transportation equipment can be, for example, a transportation vehicle, or a commercial vehicle. The use of the solution has the that the transportation equipment is able to use automatic services. Applications around the transportation vehicle can be carried out and automated without the presence of the driver or the transportation vehicle key. New business models can thus be realized.

Principles of the presently disclosed innovative concept are explained in more detail below with reference to the figures. It is understood that the innovative concept is not restricted to these exemplary embodiments and that the described features can also be combined or modified without departing from the scope of protection of the invention as defined in the appended claims.

FIG. 1 schematically shows a method for communication between a robot and transportation equipment. In a first operation, application protocols for applications compatible with the transportation equipment will be received 10 by the transportation equipment or the robot. The application protocols can be provided e.g., via a backend 60 of a manufacturer of the transportation equipment or a service provider and can include process operations with state conditions, state-changing actions or interactions. Trust levels can be specified for the actions. If necessary, the robot is initialized 11 by a manufacturer of the transportation equipment or a service provider. During initialization 11, a symmetrical key for an action to be performed by a component of the transportation equipment is transmitted to the robot. An authenticated connection is now established 12 between the robot and the transportation equipment and conditions and states, for an operation to be carried out by the robot are negotiated 13. In particular, the authenticated connection can be a two-channel connection. As a conclusion of the negotiation 13, the operation to be carried out by the robot is ordered 14. During execution of the operation to be carried out, at least one action that must be performed by a component of the transportation equipment is triggered 15 by the robot, based on an application protocol. This may require the previously transmitted symmetrical key, e.g., if the action is defined as critical. If necessary, states or sensor data can be exchanged 16 between the transportation equipment and the robot during execution of the operation to be carried out. If necessary, the action can be aborted again by the robot.

Figure 2:
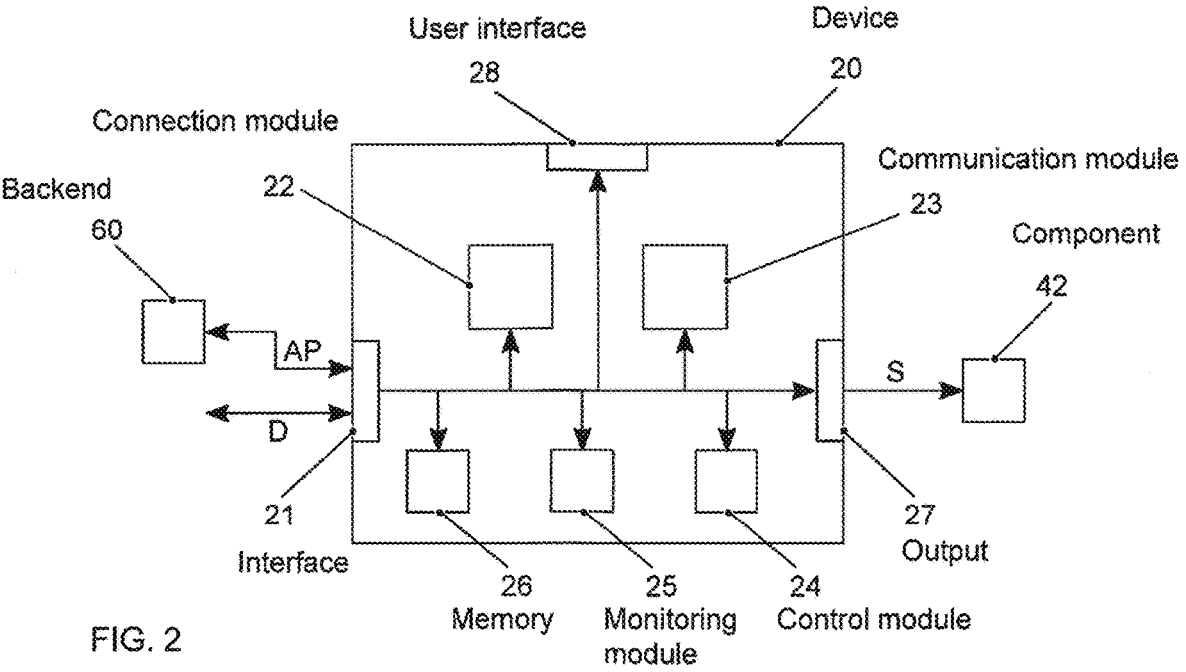
FIG. 2 shows a first embodiment of a device for communication between a robot and transportation equipment.

FIG. 2 shows a simplified schematic illustration of a first exemplary embodiment of a device 20 for communication between a robot and transportation equipment. The device 20 has an interface 21 that can be used to exchange data D between the robot and the transportation equipment. The interface can also be used to receive application protocols AP for applications compatible with the transportation equipment, e.g., from a backend 60 of a manufacturer of the transportation equipment or a service provider. The application protocols AP can include in particular process operations with state conditions, state-changing actions or interactions. Trust levels can be specified for the actions. A connection module 22 is configured to establish an authenticated connection between the robot and the transportation equipment. In particular, the authenticated connection can be a two-channel connection. A communication module 23 is configured to negotiate conditions and states, for an operation to be carried out by the robot and to order the operation to be carried out by the robot. A control module 24 is configured to trigger the robot, at least one action to be performed by a component 42 of the transportation equipment, in response to a corresponding command. The action is based on an application protocol AP. For this purpose, the control module 24 can output, for example, corresponding control commands S to the affected component 42 via an output 27 of the device 20. If necessary, states or sensor data can be exchanged between the transportation equipment and the robot via the interface 21 during execution of the operation to be carried out. If necessary, the action can be aborted again by the robot by a corresponding command. A symmetrical key may be required to trigger the action, e.g., if the action is defined as critical. For this purpose, the key can be previously transmitted to the robot as part of an initialization of the robot by a manufacturer of the transportation equipment or a service provider.

The connection module 22, the communication module 23 and the control module 24 can be controlled by a monitoring module 25. Settings of the connection module 22, the communication module 23, the control module 24 or the monitoring module 25 can be changed if necessary via a user interface 28. The data occurring in the device 20 can be stored, if necessary, in a memory 26, for example, for later evaluation or for use by the components of the device 20. The connection module 22, the communication module 23, the control module 24 and the monitoring module 25 can be realized as dedicated hardware, for example, as integrated circuits. Of course, they can also be partially or completely combined or implemented as software that runs on a suitable processor, for example, on a GPU or a CPU. The interface 21 and the output 27 can be implemented as separate interfaces or as a combined bidirectional interface.

Figure 3:
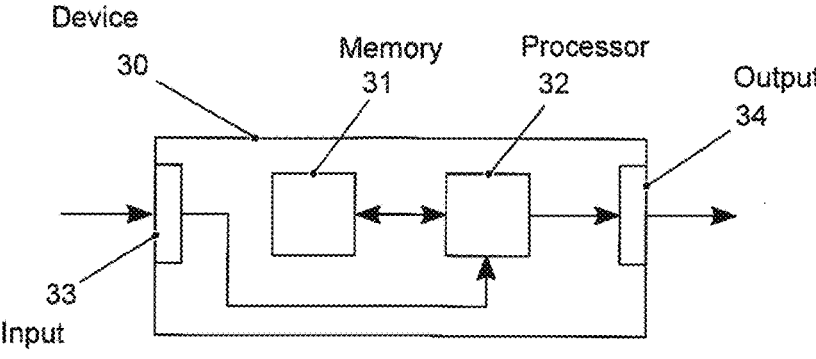
FIG. 3 shows a second embodiment of a device for communication between a robot and transportation equipment.

FIG. 3 shows a simplified schematic illustration of a second exemplary embodiment of a device for communication between a robot and transportation equipment. The device 30 comprises a processor 32 and a memory 31. For example, the device 30 is a computer or a control unit. The memory 31 stores instructions that cause the device 30 to perform the operations according to one of the described methods when executed by the processor 32. The instructions stored in the memory 31 thus embody a program, which can be executed by the processor 32 and implements the disclosed method. The device 30 has an input 33 for receiving information, for example, information on operating actions of a user of the machine. Data generated by the processor 32 are provided via an output 34. They can also be stored in the memory 31. The input 33 and the output 34 can be combined to form a bidirectional interface.

The processor 32 may comprise one or more processor units, such as microprocessors, digital signal processors, or combinations thereof.

The memories 26, 31 of the exemplary embodiments described may have both volatile and non-volatile memory areas and may comprise a wide variety of storage devices and storage media, for example, hard disks, optical storage media or semiconductor memories.

An exemplary embodiment of a solution will be described below using FIGS. 4 to 7.

Figure 4:
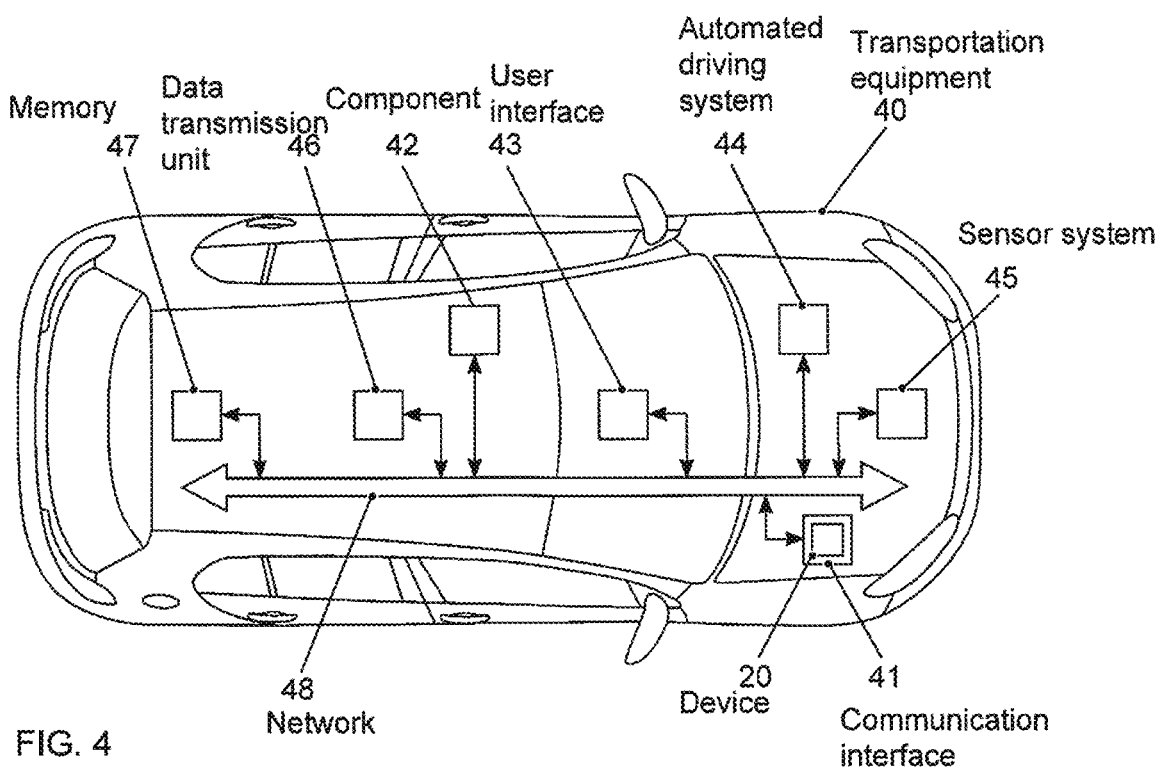
FIG. 4 schematically illustrates transportation equipment in which a solution according to the disclosed is realized.

FIG. 4 schematically illustrates transportation equipment 40 in which a solution is realized. In this example, the transportation equipment 40 is a transportation vehicle. The transportation vehicle has a communication interface 41, which in this case includes, for example, a device 20 for communication between the transportation vehicle and a robot. The transportation equipment 40 is configured to use automatic services in conjunction with a robot. When implementing such an automatic service, it may be necessary for components 42 of the transportation equipment to perform actions in response to appropriate instructions from the robot. The components 42 may be, for example, actuating drives, for example, for opening or closing doors, the tailgate or loading flap, or for raising or lowering the windows. They can also be control units, e.g., a brake control unit or a steering control unit, which may receive instructions from an automated driving system 44. It is possible to interact with an operator of the transportation vehicle via a user interface 43. For example, in this way, a request may be made to the operator to carry out certain actions in preparation for an automatic service, because, for example, the transportation vehicle cannot perform these automatically. Further components of the transportation vehicle are a sensor system 45 for capturing environmental information or state data relating to the transportation vehicle and a data transmission unit 46. The sensor system 45 can include, for example, cameras, radar sensors, lidar sensors or ultrasonic sensors. The data transmission unit 46 can be used to establish connections to a robot and to a backend, e.g., for exchanging data or for receiving application protocols. There is a memory 47 for storing data. The memory 47 may also be part of the communication interface 41 or another component of the transportation vehicle. Data are exchanged between the various components of the transportation vehicle via a network 48.

Figure 5:
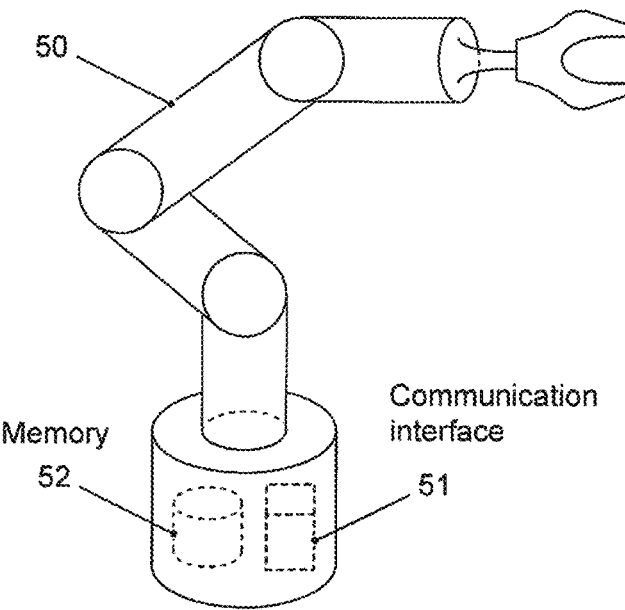
FIG. 5 schematically illustrates a robot in which a solution according to the disclosed is realized.

FIG. 5 schematically illustrates a robot 50 in which a solution is realized. The robot 50 is configured to perform automatic services in conjunction with transportation equipment. The robot 50 has a communication interface 51 which allows connections to transportation equipment and to a backend. For example, the robot 50 can receive, from the backend, application protocols that include process operations with state conditions, state-changing actions or interactions for an automatic service. In addition, if necessary, the backend can transmit keys for specific actions to be performed as part of an automatic service. Received data can be stored, if necessary, in a memory 52 of the robot 50. In FIG. 5, the memory 52 is part of the robot 50, but it can also be connected to the robot 50 only via a data connection.

Figure 6:
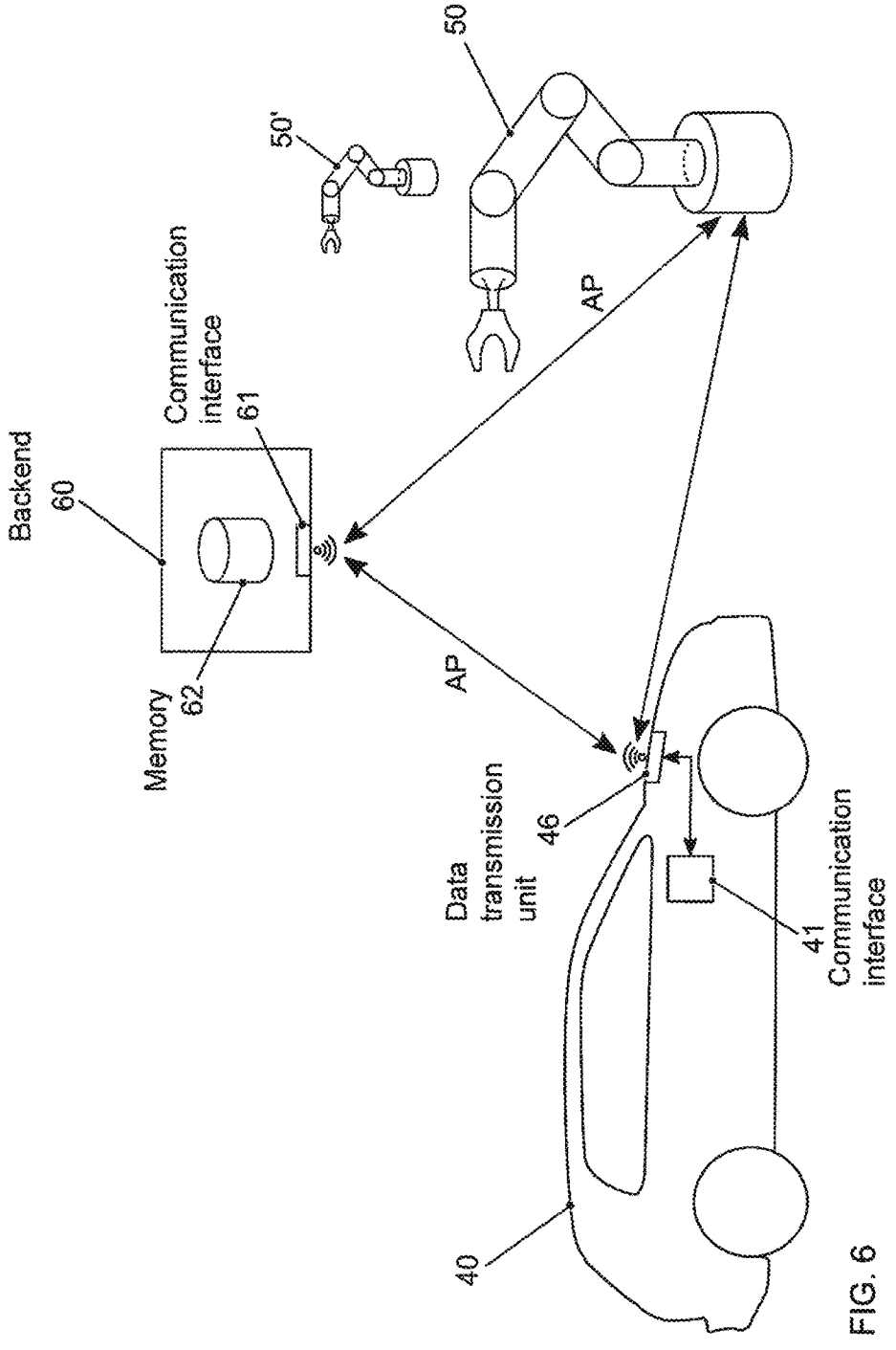
FIG. 6 schematically shows a system diagram of a solution according to the disclosed.

FIG. 6 schematically shows a system diagram of a solution. In addition to transportation equipment 40, on which an automatic service is intended to be performed, and at least one robot 50 which performs the automatic service, the system comprises a backend 60 of a manufacturer of the transportation equipment 40 or a service provider. In addition, further robots 50' can be involved in the automatic service. The transportation equipment 40 has a communication interface 41, via which it communicates with the robot 50 using a data transmission unit 46. Communication with other infrastructure facilities or smart devices is also possible in this way. Optionally, a wireless communication technology, such as WLAN or BLUETOOTH® may be used. The data transmission unit 46 also enables communication between the transportation equipment 40 and the backend 60, e.g., by a mobile radio connection. For this purpose, the backend 60 also has a communication interface 61. Application protocols AP can be provided by the backend 60 and transmitted to the transportation equipment 40 after the corresponding processes for new applications have been described and approved. For example, the application protocols AP can be stored in a memory 62 of the backend 60. Depending on the chosen implementation, the backend 60 can also serve as an interface to the customer, e.g., for booking or billing services. If necessary, communication can also take place between the robot 50 and the backend 60. For example, application protocols AP can also be transmitted from the backend 60 to the robot 50. Likewise, information about its state, i.e., about possible faults or availability, can be transmitted from the robot 50 to the backend 60, possibly in response to a corresponding request by the backend 60.

The communication interface 41 of the transportation equipment 40 has a data memory for storing the currently valid application protocols AP for applications compatible with the transportation equipment 40. It also provides authentication keys for communication outside the transportation vehicle and implements logic control depending on the application protocol AP requested. This logic control uses input variables both inside and outside the transportation vehicle. Examples of input variables inside the transportation vehicle are transportation vehicle states, end positions, sensor system data or data interpretations. Examples of input variables outside the transportation vehicle are commands or state specifications from the robot 50, other infrastructure facilities or smart devices, as well as the type, requirements and availability of the applications.

Output variables of the logic control can be divided into output variables inside and outside the transportation vehicle as well as automatic driving actions. Examples of output variables inside the transportation vehicle are primarily actuation of actuators, such as the drives of windows or flaps, as well as the switching on or off of lights, indicating elements, air conditioning system etc. Examples of output variables outside the transportation vehicle are information on the transportation equipment 40, e.g., the input variables inside the transportation vehicle or constant transportation vehicle parameters such as the dimensions, as well as information required for booking and paying for services. In addition, fault memory entries and diagnostic data, possibly complete UDS data (UDS: Unified Diagnostic Services), may be output. An example of an automatic driving action is driving to a target pose, i.e., a predefined position and orientation.

Other input and output variables of the logic control relate to the establishment of a relationship of trust. The trust levels of the actions and details of the security protocols used are only mentioned here by way of example. For each cryptographic application, a selection of the following elements may be available: cryptography parameters, such as algorithm, key or parameter, specific key information, such as key ID, transmitter counter, sender counter, receiver counter, recipient counter, robot identification number, transportation vehicle identification number, SALT or time stamp, counter, challenge or signature. The specific elements used are at the discretion of a person skilled in the art.

The use of a solution is described below by way of example using a specific application. This is an inspection of a transportation vehicle, during which a wheel inspection is also intended to be carried out. This makes it necessary to move the transportation vehicle, for which the brake must be released, the gear must be disengaged and the transportation vehicle must be moved. The brake must then be re-applied and the transmission put in the park position. It is assumed here that the transportation vehicle does not have a fully automatic valet parking function. However, the transportation vehicle has a parking-steering assistant, which means that acceleration, braking and steering can be influenced, but a driver is actually required to monitor the traffic situation. Since the service is intended to be performed automatically and, therefore, no driver can intervene, communication moves outside the classic status of the transportation vehicle. Therefore, there is a need for special authentication of the action with respect to each participant, i.e., with respect to each involved control unit in the transportation vehicle.

The challenges are, therefore, that the required movement of the transportation vehicle must be calculated and transmitted taking into account the infrastructure, such as static obstacles. In addition, the hazardous area must be monitored, i.e., a safety distance x around the transportation vehicle and a safety distance y in the direction of movement. Furthermore, a secure, optionally, two-channel connection must be established, and an approval for the movement of the transportation vehicle must be given. During the movement of the transportation vehicle, the robot or infrastructure facilities should monitor the position or path deviation of the transportation vehicle. In the event of an emergency, e.g., when people or another transportation vehicle approach(es), an emergency stop of the transportation vehicle should be triggered. It should also be possible to cancel it again without human intervention. Finally, it is desirable to document the fault-free or faulty movement of the transportation vehicle.

The driving movement can now proceed as follows. The robot first calculates and transmits the required movement of the transportation vehicle. It also announces a critical action. The transportation vehicle then sends a ready message for the critical action. The robot and the transportation vehicle now start a secure, optionally, two-channel communication connection. The robot issues an approval, whereupon the transportation vehicle releases the brake, switches to the driving mode (D) or (R) depending on the direction of movement and moves in the direction of the desired pose on the specified path. In the event of danger, the robot triggers an emergency stop. When the transportation vehicle reaches the desired pose, it applies the brake and switches to the driving mode (P). The robot confirms that the desired pose has been reached and that the transportation vehicle is in a safe state. The robot and the transportation vehicle then clear the secure communication connection.

Figure 7:
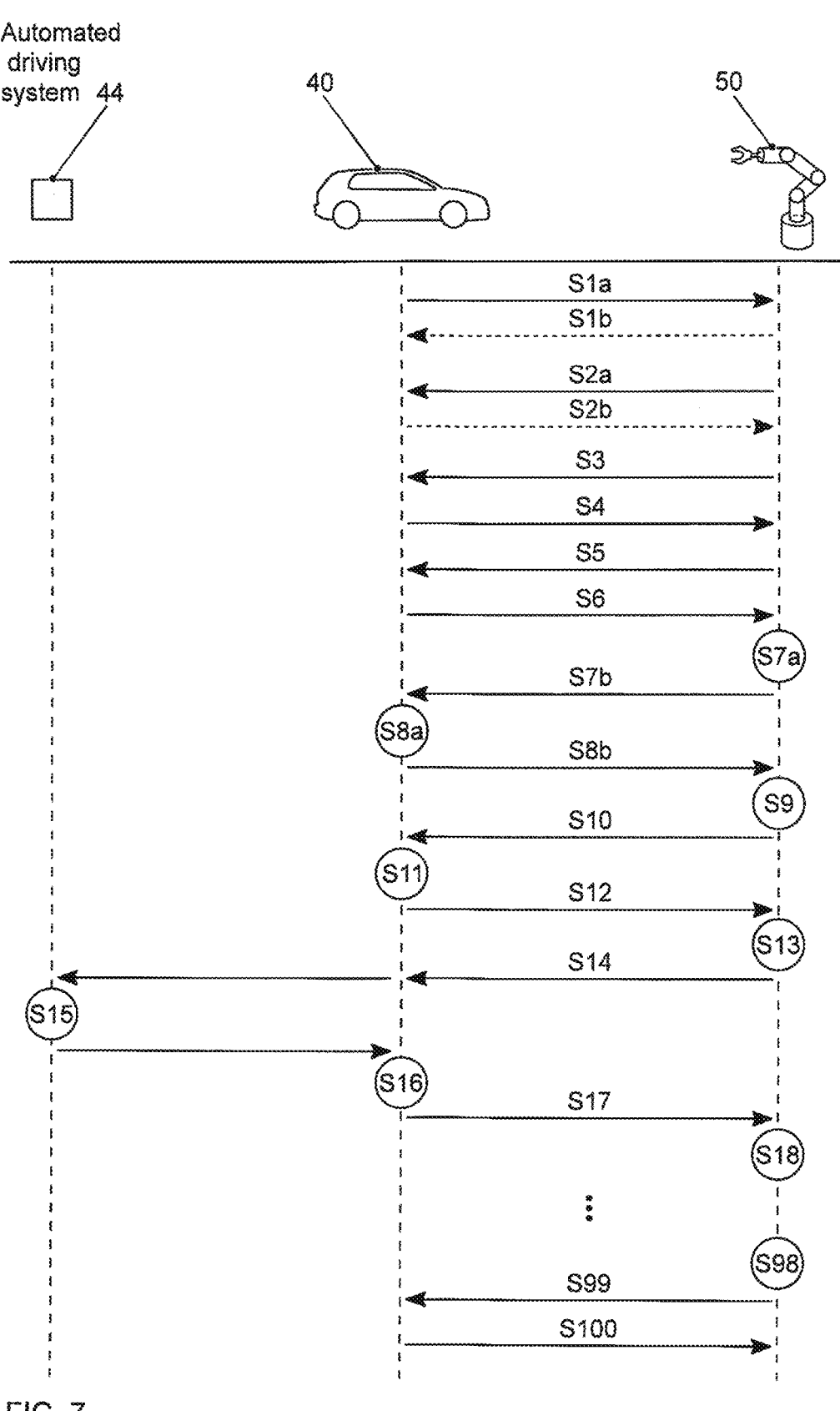
FIG. 7 shows, by way of example, a communication sequence within the framework of an automatic service.

FIG. 7 shows, by way of example, a communication sequence within the framework of an automatic service. A connection was previously established between transportation equipment 40 and a robot 50. The type of air interface used for this is irrelevant. Communication is mutually authenticated by certificates. The transportation equipment 40 sends S1*a* interest in a service. The robot 50 then sends S2*a* an offer for the service. The offer includes, for example, a price for the service and an ID and a version name of the robot 50. Alternatively, the expression of interest and offer can also be made in reverse order, represented by the dotted arrows S1*b*, S2*b*. The robot 50 then sends S3 a request for the information required for the services, e.g., the ID and, if necessary, the form of the transportation equipment 40, specific equipment, requirements for the service, type of payment, etc. The transportation equipment 40 responds S4 to the request with the requested information or a rejection. The robot 50 now transmits S5 a possible process sequence and the transportation equipment 40 books S6 the service vis-à-vis the robot 50. The robot 50 validates S7*a* the booking and commits itself S7*b* with regard to the offer. The transportation equipment 40 validates S8*a* the commitment, changes to a start state and sends S8*b* a ready message. The actual service then takes place. The robot 50 performs S9 part 1 of the service and then sends S10 a ready message. The transportation equipment 40 changes S11 its state for part 2 of the service and then sends S12 a ready message. The robot 50 performs S13 part 2 of the service and then sends S14 a ready message and now also a command for an action classified as critical for part 3 of the service. For example, the transportation equipment 40 can be instructed to drive a certain distance ahead. An automated driving system 44 of the transportation equipment 40 validates S15 the command and the transportation equipment 40 changes S16 its state for part 3 of the service upon successful validation. The transportation equipment 40 then sends S17 a ready message. The robot 50 now performs S18 part 3 of the service. This process continues until the last part of the service is finally performed S98 and the robot 50 sends S99 an end message. The transportation equipment responds S100 with an end message and releases the payment.

The messages to be exchanged as part of the communication between the transportation equipment and the robot can be in the form of {protocol info, participant, status, service, business, security}, for example. The specific configuration is at the discretion of a person skilled in the art.

For example, the protocol info element specifies whether it is a connection establishment, a service offer, a confirmation, a commitment, a ready message, or an end message.

The participant element includes, for example, an identifier, information on whether it is a robot or transportation equipment, the type of robot or transportation equipment, a configuration of the robot or transportation equipment or additional information on the robot or the transportation equipment.

The status element includes, for example, information on the version, hardware or software of components of the transportation equipment, information on the last update, and the state of charge or damage. It may also include information on the occupancy of the transportation equipment or whether doors are locked, whether windows are open, whether the parking brake is activated, or which steering angle is set. Alternatively, the status element can also be included in the participant element.

The service element includes, for example, information on the supply or demand, a name and, if necessary, a description of the service for the customer, information on demands on the transportation equipment, the environment, infrastructure or the robot, a generic process sequence, e.g., in the supply of the service, a detailed process sequence, the required time, or the individual actions in detail, such as disengaging the gear, opening the door, providing information, etc.

The business element includes, for example, information on the price, the budget, a voucher, payment information, or a payment confirmation.

The security element includes, for example, information on the type of cryptographic application, such as encryption or signing, the cryptographic algorithm used and the configuration, such as AES-GCM (Advanced Encryption Standard with Galois/Counter Mode), MAC SHA2 (Medium Access Control with Secure Hash Algorithm), key information that may depend on the cryptographic application, such as key ID, derivation parameters or certificate ID, or cryptographic components such as signature, hash or challenge.

Provision may be made to use sensors of the transportation equipment for monitoring to safeguard the robot process, e.g., sensors for interior monitoring. In this case, it is beneficial if the protocol used additionally also provides fields for the robot movements or even a template of the robot movement for each application protocol. If the sensor measurement deviates from the intended movement, the movement can be stopped and an intervention by a suitable person can be requested. For example, the template can be learned using artificial intelligence algorithms by observing the processes on transportation equipment.

In the solution, a variety of connections and relationships of trust are made possible. Examples include the connection between the robot and the backend for initialization for each secret and for the transmission of specific keys for the transportation equipment, the connection between the robot and the transportation equipment, e.g., by public key infrastructure, the connection between the robot and a control unit, which requires a higher trust level, by a symmetrical key, and, if appropriate, the connection of the backend to such a control unit via the robot for an end-to-end connection. In addition, there may be a connection between a plurality of robots that work together on transportation equipment. In addition, a plurality of robots can be connected to the transportation equipment in a distinguishable manner. Furthermore, there may be a connection between a plurality of robot modules that connect together to form another robot, e.g., a charging robot with a transport robot.

Even in future transportation vehicle architectures, embedded systems such as the brake and the transmission are cryptographically limited to symmetrical algorithms. Future asymmetric algorithms will need to be post-quantum secure and will most likely become much more complex and require significantly longer keys, making them even less usable for embedded systems. There is, therefore, a need to authenticate the integrity of triggering an action, which requires a higher trust level, from the backend to the embedded control unit involved. This can be carried out in such a way that a robot is first initialized for a certain action of transportation equipment by a backend. This can already be done in advance, e.g., because the transportation equipment is planned for a service. As part of this initialization, the robot first requests a key required for the action and receives it from the backend. The key may also have been generated by the corresponding control unit. Now generally, authenticated contact is established between the robot and the transportation equipment, e.g., based on a public key infrastructure using a certificate and a public key algorithm, e.g., ECDSA (Elliptic Curve Digital Signature Algorithm) or TLS (Transport Layer Security). Further communication can then take place via this channel. The key transmitted during initialization can now be used to authentically trigger the action with a higher trust level.

The principle of key distribution can be described in detail as follows. It is assumed that the symmetrical keys of the transportation equipment are present in the backend. Each key has an ID. For example, K29 is the key with the ID 29. Such a key always has the same properties and applications, e.g., the authorization of a braking action, which requires a high trust level. A key is always individual for each transportation equipment. The key of the transportation equipment with the identification number VIN for the braking action is, therefore, K29_VIN. A robot with robot ID ID_R has a connection to the backend at any time before communicating with the transportation equipment with the identification number VIN. A cryptographic key derivation can be performed deterministically using a hash function. The parameter x is derived from key K with the notation $K(x)$. The result is a new key that can only be calculated by someone who knows K. The robot with the robot ID ID_R now asks the backend for the key with which it can perform a braking action on the transportation equipment with the identification number VIN. The backend then calculates K_ID_R_VIN=K29_VIN(ID_R, SALT, timer). The robot can now send a message to the transportation equipment with the action to be performed, e.g., "Release the brake", a signature which is determined from the message with the key K_ID_R_VIN and serves to authenticate the critical command from the robot by the involved brake control unit of the transportation equipment, and the parameters ID R, SALT, timer. This allows the brake control unit in the transportation equipment that knows K29_VIN to calculate K_ID_R_VIN=K29_VIN(ID_R, SALT, timer), that is to say the key that is intended for the relationship of trust between the brake control unit and the robot and that is not known by other control units in the transportation equipment, and thus to authenticate the signature. This ensures that an authorized robot is allowed to send the command via the communication interface. An online or Car2Car control unit should otherwise never trigger the release of the brakes, for example. After successful authentication, the brake control unit finally performs the required "Release brake" action.

LIST OF REFERENCE SIGNS

10 Receive application protocols
11 Initialize the robot
12 Establish an authentic connection
13 Negotiate conditions and states
14 Order an operation to be carried out
15 Trigger an action
16 Exchange states or sensor data
20 Device
21 Interface
22 Connection module
23 Communication module
24 Control module
25 Monitoring module
26 Memory
27 Output
28 User interface
30 Device
31 Memory
32 Processor
33 Input
34 Output
40 Transportation equipment
41 Communication interface
42 Component
43 User interface
44 Automated driving system
45 Sensor system
46 Data transmission unit
47 Memory
48 Network
50 50' Robot
51 Communication interface
52 Memory
60 Backend
61 Communication interface
62 Memory
AP Application protocol
D Data
S Control command
S1-S100 Messages
VIN Identification number

The invention claimed is:

1. A method for communication between a robot and transportation equipment as part of automated service delivery to the transportation equipment, wherein the service includes an operation that includes at least one required action, the method comprising:
establishing a mutually authenticated connection between the robot and the transportation equipment as part of automated service delivery to the transportation equipment, wherein the mutually authenticated connection is established based on a public key infrastructure and mutually authenticated by certificates such that a symmetrical key specific for the action, which is to be performed by a component of the transportation equipment, is transmitted to the robot;
negotiating conditions and states for an operation to be carried out by the robot relative to the transportation equipment as part of automated service delivery to the transportation equipment;
ordering the operation to be carried out by the robot relative to the transportation equipment as part of the automated service delivery to the transportation equipment; and
triggering, by the robot, the at least one action required to be performed by the component of the transportation equipment as part of automated service delivery to the transportation equipment, wherein the at least one action is based on an application protocol for an application that is compatible with the transportation equipment for the automated service delivery to the transportation equipment.

2. The method of claim 1, further comprising receiving wherein application protocols for applications compatible with the transportation equipment are received by the transportation equipment or the robot from a backend of a manufacturer of the transportation equipment or a service provider of the automated service delivery to the transportation equipment.

3. The method of claim 2, wherein the application protocols include process operations with state conditions, state-changing actions or interactions that are part of automated service delivery to the transportation equipment.

4. The method of claim 1, wherein trust levels are specified for actions to be performed by the component of the transportation equipment including the at least one action to be performed as part of the automated service delivery to the transportation equipment.

5. The method of claim 1, wherein the robot is configured to be able to abort actions to be performed by the component of the transportation equipment.

6. The method of claim 1, further comprising exchanging states or sensor data between the transportation equipment and the robot.

7. The method of claim 1, wherein the authenticated connection is a two-channel connection.

8. The method of claim 1, further comprising initializing the robot by a manufacturer of the transportation equipment or a service provider, during which a symmetrical key for an action to be performed by a component of the transportation equipment is transmitted to the robot.

9. The method of claim 8, wherein the symmetrical key is used to trigger an action defined as critical in the authenticated connection.

10. The method of claim 1, further comprising establishing a trust relationship between the transportation equipment and a plurality of robots.

11. A non-transitory computer readable medium including a computer program with instructions which, when executed by a computer, cause the computer to perform operations of a method for communication between a robot and transportation equipment as part of automated service delivery to the transportation equipment, wherein the service includes an operation that includes at least one required action, the method comprising:
establishing a mutually authenticated connection between the robot and the transportation equipment as part of automated service delivery to the transportation equipment, wherein the mutually authenticated connection is established based on a public key infrastructure and mutually authenticated by certificates such that a symmetrical key specific for the action, which is to be performed by a component of the transportation equipment, is transmitted to the robot;

negotiating conditions and states for an operation to be carried out by the robot;

ordering the operation to be carried out by the robot; and triggering, by the robot, at least one action to be performed by a component of the transportation equipment, wherein the at least one action is based on an application protocol.

12. A device for communication between a robot and transportation equipment as part of automated service delivery to the transportation equipment as part of automated service delivery to the transportation equipment, wherein the service includes an operation that includes at least one required action, the device comprising:

a connection module for establishing a mutually authenticated connection between the robot and the transportation equipment as part of automated service delivery to the transportation equipment, wherein the mutually authenticated connection is established based on a public key infrastructure and mutually authenticated by certificates such that a symmetrical key specific for the action, which is to be performed by a component of the transportation equipment, is transmitted to the robot;

a communication module for negotiating conditions and states for an operation to be carried out by the robot and for ordering the operation to be carried out by the robot relative to the transportation equipment as part of automated service delivery to the transportation equipment; and a control module for triggering, by the robot, at least one action to be performed by a component of the transportation equipment as part of automated service delivery to the transportation equipment, wherein the at least one action is based on an application protocol for an application that is compatible with the transportation equipment for the automated service delivery to the transportation equipment.

13. A communication interface for communication between a robot and transportation equipment as part of automated service delivery to the transportation equipment, wherein the communication interface is configured:

to receive application protocols for applications compatible with the transportation equipment from a backend of a manufacturer of the transportation equipment or a service provider of the automated service delivery to the transportation equipment;

to establish a mutually authenticated connection between the robot and the transportation equipment relative to the transportation equipment as part of automated service delivery to the transportation equipment, wherein the mutually authenticated connection is established based on a public key infrastructure and mutually authenticated by certificates such that a symmetrical key specific for the action, which is to be performed by a component of the transportation equipment, is transmitted to the robot;

to negotiate conditions and states for an operation to be carried out by the robot and to order the operation to be carried out by the robot relative to the transportation equipment as part of automated service delivery to the transportation equipment; and to trigger, by the robot, the at least one action to be performed by a component of the transportation equipment as part of automated service delivery to the transportation equipment, wherein the at least one action is based on an application protocol for an application that is compatible with the transportation equipment for the automated service delivery to the transportation equipment.

14. Transportation equipment comprising the communication interface as claimed in claim 13.

15. A robot configured to communicate with transportation equipment as part of automated service delivery to the transportation equipment as part of automated service delivery to the transportation equipment, wherein the service includes an operation that includes at least one required action, the robot configured to:

establish a mutually authenticated connection between the robot and the transport transportation equipment as part of automated service delivery to the transportation equipment, wherein the mutually authenticated connection is established based on a public key infrastructure and mutually authenticated by certificates such that a symmetrical key specific for the action, which is to be performed by a component of the transportation equipment, is transmitted to the robot;

negotiate conditions and states for an operation to be carried out by the robot relative to the transportation equipment as part of automated service delivery to the transportation equipment;

order the operation to be carried out by the robot relative to the transportation equipment as part of automated service delivery to the transportation equipment; and trigger, by the robot, the at least one action to be performed by a component of the transport transportation equipment as part of automated service delivery to the transportation equipment, wherein the at least one action is based on an application protocol for an application that is compatible with the transportation equipment for the automated service delivery to the transportation equipment.

* * * * *